United States Patent
Wang et al.

(10) Patent No.: US 9,947,251 B2
(45) Date of Patent: Apr. 17, 2018

(54) ACTIVE DEVICE ARRAY SUBSTRATE

(71) Applicant: Chunghwa Picture Tubes, LTD., Taoyuan (TW)

(72) Inventors: Hao-Wei Wang, Pingtung County (TW); Chia-Ming Chiang, Taoyuan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 364 days.

(21) Appl. No.: 14/750,692

(22) Filed: Jun. 25, 2015

(65) Prior Publication Data
US 2016/0291085 A1 Oct. 6, 2016

(30) Foreign Application Priority Data
Apr. 1, 2015 (TW) .............................. 104110698 A

(51) Int. Cl.
*G01R 31/08* (2006.01)
*G09G 3/00* (2006.01)
(Continued)

(52) U.S. Cl.
CPC ........... *G09G 3/006* (2013.01); *G02F 1/1333* (2013.01); *G09G 3/3611* (2013.01); *G09G 2300/0426* (2013.01); *G09G 2330/08* (2013.01)

(58) Field of Classification Search
CPC ............... G09G 3/006; G09G 2330/08; G09G 2300/0426; G09G 3/3611; G02F 1/1333; G01R 31/28
See application file for complete search history.

(56) References Cited

U.S. PATENT DOCUMENTS

2007/0080905 A1\* 4/2007 Takahara ............. G09G 3/3233
345/76
2008/0007667 A1\* 1/2008 Nakayama ........ G02F 1/136204
349/54
(Continued)

FOREIGN PATENT DOCUMENTS

TW 200903768 1/2009
TW I385453 2/2013

OTHER PUBLICATIONS

"Office Action of Taiwan Counterpart Application", dated Feb. 19, 2016, p. 1-p. 7.

*Primary Examiner* — Jermele M Hollington
*Assistant Examiner* — Suresh K Rajaputra
(74) *Attorney, Agent, or Firm* — J.C. Patents

(57) ABSTRACT

An active device array substrate includes a substrate, an inspection circuit, pixel structures, a passivation layer, and conductive pads. The substrate has a display area and a peripheral area outside the display area. The inspection circuit is located on the substrate and includes inspection switches, inspection control lines, and inspection traces. Each of the inspection switches is located in the peripheral area and controlled by one of the inspection control lines. Each of the inspection traces is connected to one of the inspection switches and includes a first conductive wire segment and a second conductive wire segment. The second conductive wire segment is connected between the first conductive wire segment and one corresponding inspection switch. An electric conductivity of the second conductive wire segment is lower than an electric conductivity of the first conductive wire segment.

13 Claims, 6 Drawing Sheets

(51) Int. Cl.
 *G02F 1/1333* (2006.01)
 *G09G 3/36* (2006.01)

(56) References Cited

U.S. PATENT DOCUMENTS

| | | | |
|---|---|---|---|
| 2009/0014726 A1* | 1/2009 | Liu | H01L 27/0248 257/72 |
| 2009/0020767 A1* | 1/2009 | Hsu | G02F 1/1362 257/88 |
| 2009/0207369 A1* | 8/2009 | Lin | G02F 1/13452 349/152 |
| 2010/0032672 A1* | 2/2010 | Lo | G02F 1/13458 257/59 |

* cited by examiner

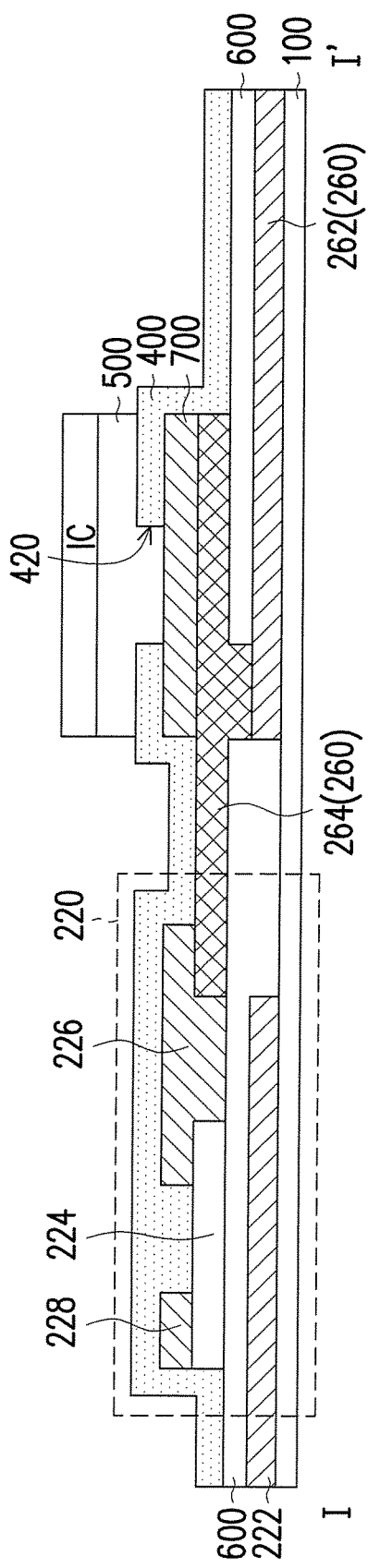
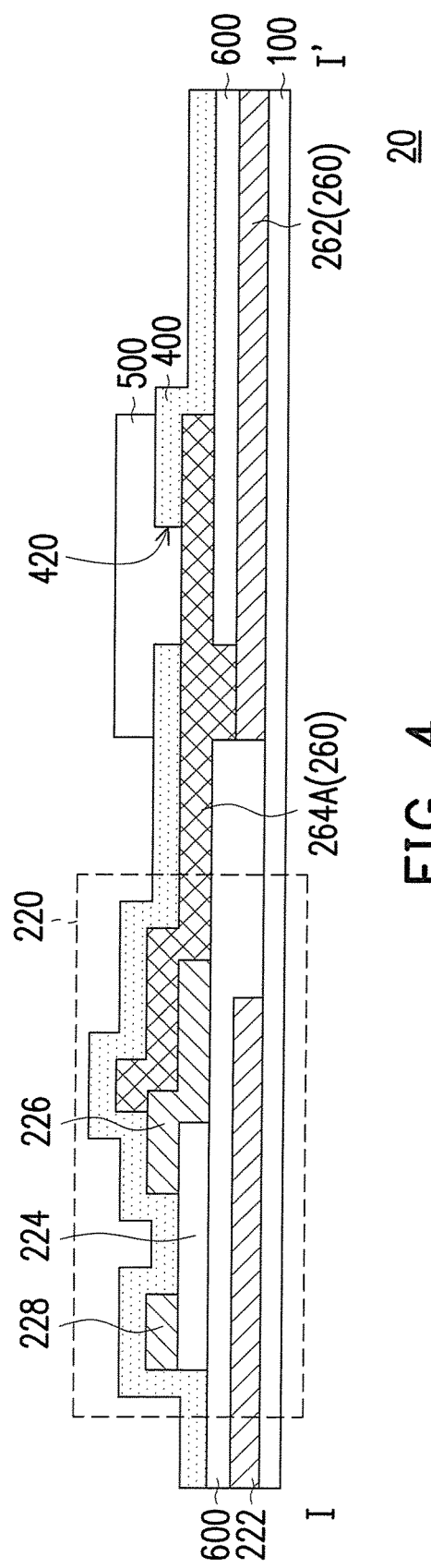

ACTIVE DEVICE ARRAY SUBSTRATE

CROSS-REFERENCE TO RELATED APPLICATION

This application claims the priority benefit of Taiwan application serial no. 104110698, filed on Apr. 1, 2015. The entirety of the above-mentioned patent application is hereby incorporated by reference herein and made a part of this specification.

FIELD OF THE INVENTION

The invention relates to an active device array substrate, and more particularly, to an active device array substrate having an inspection circuit characterized by reduced current leakage.

DESCRIPTION OF RELATED ART

With the advance of display technologies, in most cases, an electrical inspection of an active device array substrate is often carried out after a manufacturing process of the active device array substrate is completed, or a simple inspection of the display function of a panel is carried out after a manufacturing process of the panel is completed, so as to determine whether the active device array substrate or the panel can function as normal; if not, the defective device or wirings can be repaired instantly.

In order to carry out the inspection of the active device array substrate or the inspection of the panel, an inspection circuit need be arranged on a peripheral area of the active device array substrate, and the inspection circuit includes a plurality of inspection switches for carrying out the inspection of the active device array substrate or the inspection of the panel. In the event that a high voltage is supplied to gates of the inspection switches, i.e., if the inspection switches are in an on state, the inspection signals can be transmitted to the active device array substrate through the inspection switches, and thereby the inspection of the active device array substrate can be carried out. After the manufacturing process of the panel is completed, a display signal of the active device array substrate is then provided by an integrated circuit (IC). At this time, the inspection signals need not be transmitted to the panel by the inspection switches, and the inspection of the panel can still be carried out; hence, a low voltage is supplied to the gates of the inspection switches to keep the inspection switches to be in an off state.

When the inspection switches remain in the off state, some display signals may still leak through the inspection switches due to quantum tunneling effects, and thus the display of images on the panel is likely to be unsatisfactory. In order to ensure the accuracy of the result of the inspection of the display function of the panel and guarantee the favorable display quality of the resultant display panel, the existing manufacturing process often includes a laser cutting step to cut off the inspection circuit.

SUMMARY OF THE INVENTION

The invention is directed to an active device array substrate that can be equipped with an inspection circuit without deteriorating the display quality.

In an embodiment of the invention, an active device array substrate that includes a substrate, an inspection circuit, a plurality of pixel structures, a passivation layer, and a plurality of conductive pads is provided. The substrate has a display area and a peripheral area outside the display area. The inspection circuit is located on the substrate and includes a plurality of inspection switches, a plurality of inspection control lines, and a plurality of inspection traces. Each of the inspection switches is located in the peripheral area and controlled by one of the inspection control lines. Each of the inspection traces is connected to one of the inspection switches and includes a first conductive wire segment and a second conductive wire segment. The second conductive wire segment is connected between the first conductive wire segment and a corresponding inspection switch of the inspection switches, and an electric conductivity of the second conductive wire segment is lower than an electric conductivity of the first conductive wire segment. The pixel structures are arranged on the substrate and located in the display area, and each of the pixel structures is connected to the first conductive wire segment of one of the inspection traces. The passivation layer covers the inspection switches of the inspection circuit and has a plurality of pad openings, and each of the pad openings corresponds to one of the first conductive wire segments. The conductive pads are arranged on the passivation layer, and each of the conductive pads is located in one of the pad openings to electrically connect one of the inspection traces.

According to an embodiment of the invention, each of the inspection switches includes a gate, an active layer, a source, and a drain. The gate is located between the substrate and the active layer, the active layer is located between the source and the drain, the source and the drain are in contact with the active layer, the gate is separated from the active layer, the source, and the drain by an insulation layer, and the source is connected to the second conductive wire segment of one of the inspection traces.

According to an embodiment of the invention, the source of each of the inspection switches and the second conductive wire segment of one of the inspection traces connected to the each of the inspection switches are integrally formed.

According to an embodiment of the invention, the first conductive wire segment is located between the second conductive wire segment and the substrate.

According to an embodiment of the invention, the second conductive wire segment is located between the source and the gate.

According to an embodiment of the invention, the source is located between the second conductive wire segment and the gate.

According to an embodiment of the invention, the passivation layer has a plurality of inspection openings, each of the inspection openings corresponds to the source of one of the inspection switches and one of the first conductive wire segments, and each of the second conductive wire segments is arranged on the passivation layer and located in one of the inspection openings, so as to electrically connect the source of the one of the inspection switches to the one of the first conductive wire segments.

According to an embodiment of the invention, the second conductive wire segments are located between the first conductive wire segments and the substrate.

According to an embodiment of the invention, the conductive pads are in contact with the first conductive wire segments via the pad openings.

According to an embodiment of the invention, the gate of each of the inspection switches and the first conductive wire segment of the one of the inspection traces connected to the each of the inspection switches belong to one film layer.

According to an embodiment of the invention, the active device array substrate further includes a plurality of auxiliary pads, and each of the auxiliary pads is located between one of the conductive pads and one of the inspection traces, such that the one of the conductive pads is electrically connected to the one of the inspection traces via the each of the auxiliary pads.

According to an embodiment of the invention, the auxiliary pads and the source and the drain of each of the inspection switches belong to one film layer.

According to an embodiment of the invention, the first conductive wire segments and the source and the drain of each of the inspection switches belong to one film layer.

According to an embodiment of the invention, a material of the second conductive wire segment includes conductive oxide, metal, an organic conductive material, or a combination thereof.

According to an embodiment of the invention, the inspection control lines include a first inspection control line connected to the $(2n-1)^{th}$ inspection switch, a second inspection control line connected to the $(2n)^{th}$ inspection switch, and a third inspection control line connected to the $(2n+1)^{th}$ inspection switch, and n is a positive integer.

According to an embodiment of the invention, each of the pixel structures includes a scan line, a data line, an active device, and a pixel electrode. The scan line is configured to control whether the active device is switched on or switched off, and the active device is configured to transmit a signal on the data line to the pixel electrode while the active device is in an on state.

According to an embodiment of the invention, each of the inspection traces is connected to the data line of one of the pixel structures.

According to an embodiment of the invention, each of the pixel structures further includes a common electrode, and the common electrode and the pixel electrode constitute one storage capacitor.

According to an embodiment of the invention, one of the pixel electrode and the common electrode is located between the substrate and the other one of the pixel electrode and the common electrode, and the second conductive wire segment of each of the inspection traces and one of the pixel electrode and the common electrode belong to one film layer.

In view of the above, if a low voltage is provided to the gate of one of the inspection switches to keep the inspection switch to be in an off state, the second conductive wire segment that has the lower conductivity than that of the first conductive wire segment and is located between the first conductive wire segment and the corresponding inspection switch can ensure the current leakage through the inspection switch to be reduced, and favorable display quality can be further guaranteed. Moreover, owing to the arrangement of the second conductive wire segment with the lower conductivity than that of the first conductive wire segment, the laser cutting step is no longer required in the manufacturing process of the panel; thereby, manufacturing efficiency and yield can both be improved.

Several exemplary embodiments accompanied with figures are described in detail below to further describe the invention in details.

BRIEF DESCRIPTION OF THE DRAWINGS

FIG. 3 is a schematic cross-sectional view illustrating an active device array substrate along the line I-I' in FIG. 2.

FIG. 4 is a schematic view illustrating an active device array substrate according to a second embodiment of the invention.

DETAILED DESCRIPTION OF DISCLOSED EMBODIMENTS

Figure 1A:
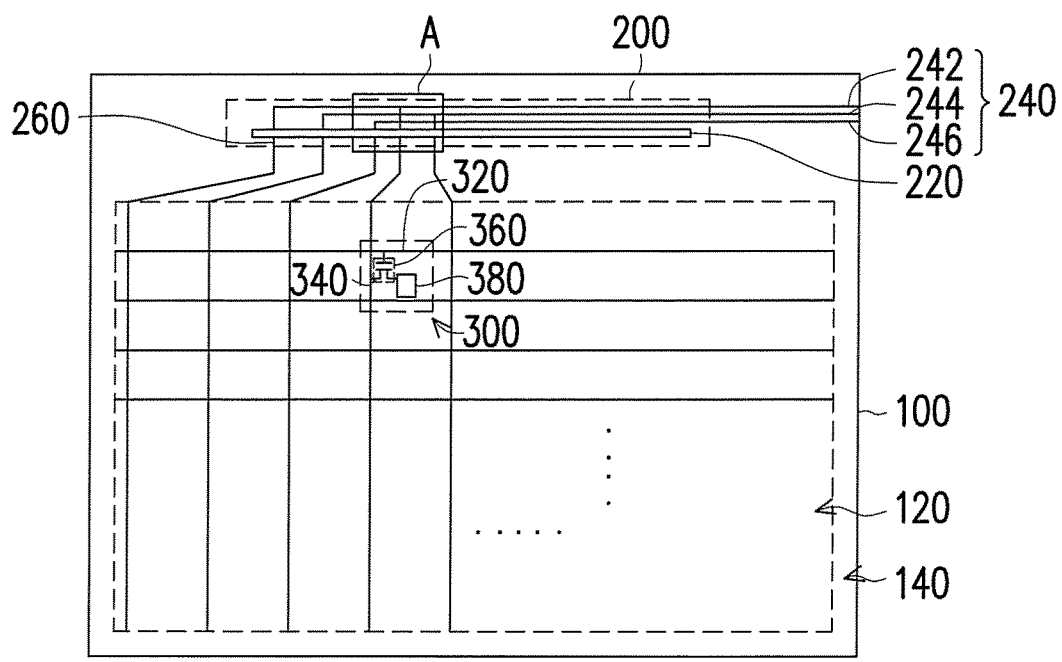
FIG. 1A is a schematic top view illustrating an active device array substrate according to a first embodiment of the invention.
Figure 2:
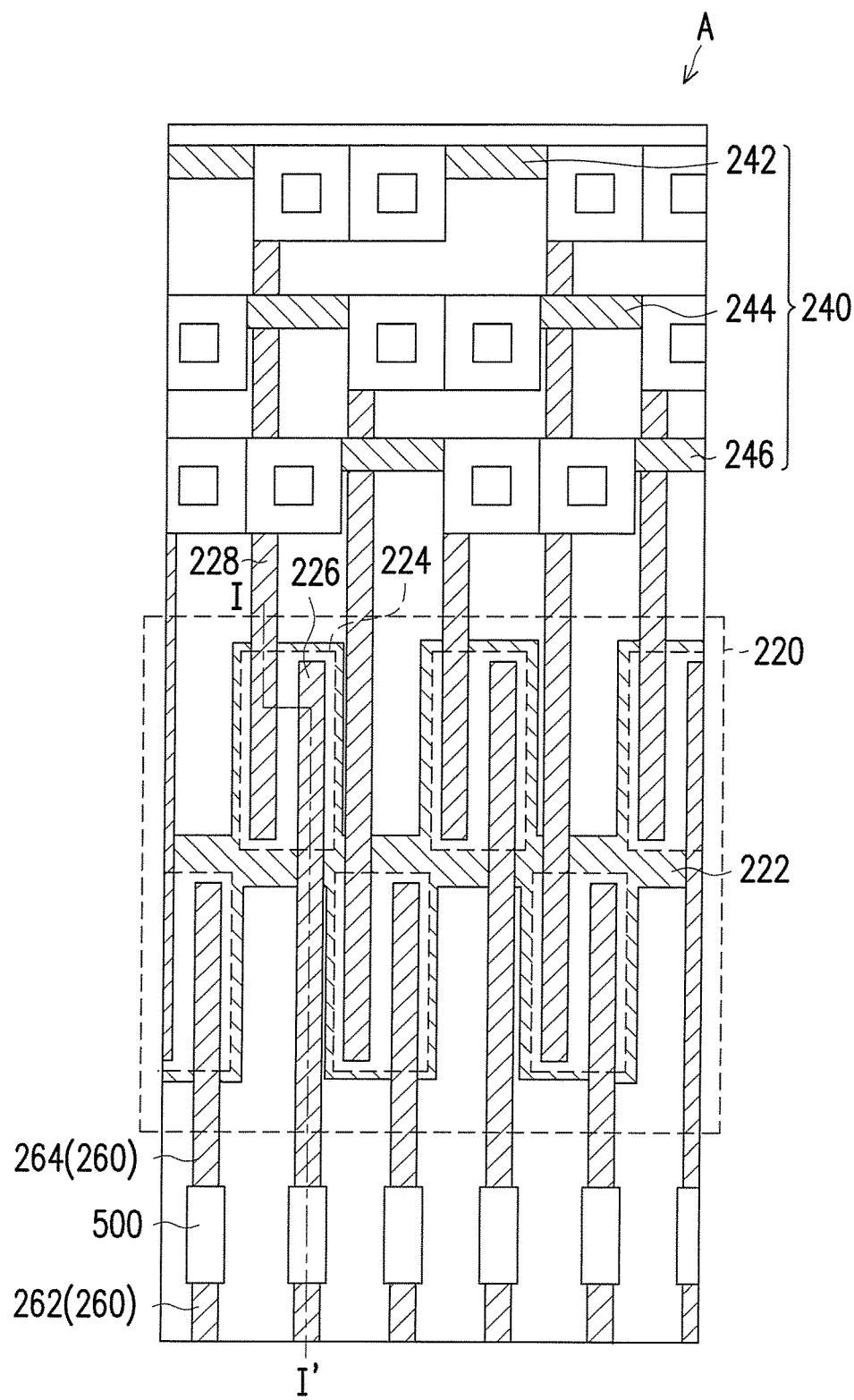
FIG. 2 is a partially enlarged diagram of the area A as depicted in FIG. 1A.

FIG. 1A is a schematic top view illustrating an active device array substrate according to a first embodiment of the invention. FIG. 2 is a partially enlarged diagram of the area A as depicted in FIG. 1A. FIG. 3 is a schematic cross-sectional view illustrating an active device array substrate along the line I-I' in FIG. 2. With reference to FIG. 1A, FIG. 2, and FIG. 3, an active device array substrate 10 includes a substrate 100, an inspection circuit 200, a plurality of pixel structures 300, a passivation layer 400, and a plurality of conductive pads 500. The substrate 100 has a display area 120 and a peripheral area 140 outside the display area 120. The inspection circuit 200 is located on the substrate 100 and includes a plurality of inspection switches 220, a plurality of inspection control lines 240, and a plurality of inspection traces 260. Each of the inspection switches 220 is located in the peripheral area 140 and controlled by one of the inspection control lines 240 to be switched on or off. Each of the inspection traces 260 is connected to one of the inspection switches 220 and includes a first conductive wire segment 262 and a second conductive wire segment 264. The second conductive wire segment 264 is connected between the first conductive wire segment 262 and a corresponding inspection switch 220, and an electric conductivity of the second conductive wire segment 264 is lower than an electric conductivity of the first conductive wire segment 262. The pixel structures 300 are arranged on the substrate 100 and located in the display area 120, and each of the pixel structures 300 is connected to the first conductive wire segment 262 of one of the inspection traces 260. The passivation layer 400 covers the inspection switches 220 of the inspection circuit 200 and has a plurality of pad openings 420, and each of the pad openings 420 corresponds to one of the first conductive wire segments 262. The conductive pads 500 are arranged on the passivation layer 400, and each of the conductive pads 500 is located in one of the pad openings 420 to electrically connect one of the inspection traces 260.

Particularly, each of the inspection switches 220 includes a gate 222, an active layer 224, a source 226, and a drain 228. The gate 222 is located between the substrate 100 and the active layer 224, the active layer 224 is located between the source 226 and the drain 228, the source 226 and the drain 228 are in contact with the active layer 224, the gate 222 is separated from the active layer 224, the source 226, and the drain 228 by an insulation layer 600, and the source 226 is connected to the second conductive wire segment 264 of one of the inspection traces 260. The inspection control lines 240 include a first inspection control line 242 connected to the $(2n-1)^{th}$ inspection switch 220, a second inspection control line 244 connected to the $(2n)^{th}$ inspection switch 220, and a third inspection control line 246 connected to the $(2n+1)^{th}$ inspection switch 220, and n is a positive integer.

In general, the predetermined display color pixel structures 300 can be categorized into red, blue, and green pixel structures, and the first inspection control line 242, the second inspection control line 244, and the third inspection control line 246 may serve to examine the red, blue, and green pixel structures, respectively. Hence, the first inspection control line 242 may be deemed as a red inspection control line, the second inspection control line 244 may be deemed as a blue inspection control line, and the third inspection control line 246 may be deemed as a green inspection control line. In another embodiment of the invention, the inspection control lines 240 may further include a fourth inspection control line and a fifth inspection control line respectively configured to control the $(2n-1)^{th}$ inspection switch 220 and the $(2n)^{th}$ inspection switch 220. That is, the fourth inspection control line 244 is configured to examine the pixel structures 300 arranged in odd rows, and the fifth inspection control line is configured to examine the pixel structures 300 arranged in even rows.

As shown in FIG. 3, the first conductive wire segment 262 is located between the second conductive wire segment 264 and the substrate 100, and the second conductive wire segment 264 is located between the source 226 and the gate 222. Thereby, the gate 222 of each of the inspection switches 220 and the first conductive wire segment 262 of the one of the inspection traces 260 connected to the each of the inspection switches 222 belong to one film layer, i.e., the gate 222 of each of the inspection switches 220 and the first conductive wire segment 262 of the one of the inspection traces 260 connected to the each of the inspection switches 222 can be formed in one manufacturing step, and it is not necessary to perform any additional manufacturing step. According to the present embodiment, each inspection trace 260 is separated into two segments, and a material of the second conductive wire segment 264 includes conductive oxide, metal, an organic conductive material, or a combination thereof. A material of the first conductive wire segment 262 may also include conductive oxide, metal, an organic conductive material, or a combination thereof; note that the electric conductivity of the second wire segment 264 can be lower than that of the first wire segment 262 by choosing the appropriate materials.

Figure 1B:
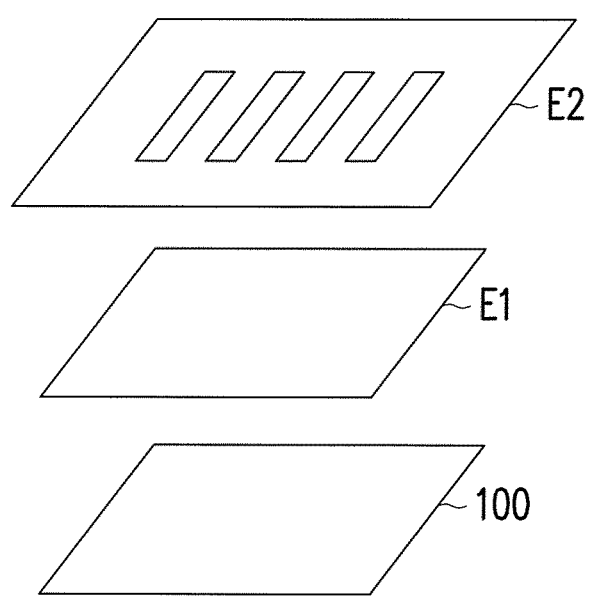
FIG. 1B illustrates the arrangement of a common electrode, a pixel electrode, and a substrate in a pixel structure.

Each of the pixel structures 300 includes a scan line 320, a data line 340, an active device 360, and a pixel electrode 380. The scan line 320 is configured to control whether the active device 360 is switched on or switched off, and the active device 360 is configured to transmit a signal on the data line 340 to the pixel electrode 380 while the active device 360 is in an on state. Each of the pixel structures 300 further includes a common electrode (not shown). The common electrode and each of the pixel electrodes 380 together form a storage capacitor. In an embodiment of the invention, as shown in FIG. 1B, if one (e.g., the electrode E1) of the pixel electrode 380 and the common electrode are located between the substrate 100 and the other one (e.g., the electrode E2) of the common electrode and the pixel electrode, the one (e.g., the electrode E1) of the common electrode and the pixel electrode and the second conductive wire segment 264 of the corresponding inspection trace 260 belong to the same film layer, and the conductive pads 500 and the other one (e.g., the electrode E2) of the common electrode and the pixel electrode belong to the same film layer. The electrode E2 is equipped with a plurality of slits, for instance, such that the pixel structure 300 becomes a fringe field type pixel structure. At this time, the second conductive wire segment 264 of each inspection trace 260 may be formed in the same film layer where the inherent components (e.g., the electrode E2) are formed, and it is not necessary to perform any additional manufacturing step.

The data line 340 of one of the pixel structures 300 is connected to the first conductive wire segment 262 of one of the inspection traces 260. Thereby, when a high voltage is supplied to the gate 222 of the inspection switch 220, i.e., if the inspection switch 220 is on, the inspection signal from the inspection control line 240 can be transmitted to the second and first conductive wire segments 264 and 262 of the inspection trace 260 through the inspection switch 220 in the on state and can then be input to the data line 340. At this time, the inspection of the active device array substrate 10 can be carried out by determining whether the inspection signal is transmitted to the pixel electrode 380 or not through switching on or off the active device 360 of the pixel structure 300.

The active device array substrate 10 provided in the present embodiment may further include a plurality of auxiliary pads 700, and each of the auxiliary pads 700 is located between one of the conductive pads 500 and one of the inspection traces 260, such that the one of the conductive pads 500 is electrically connected to the one of the inspection traces 260 via the each of the auxiliary pads 700. Here, the auxiliary pads 700 and the source 226 and the drain 228 of each of the inspection switches 220 belong to one film layer, i.e., the auxiliary pads 700 and the source 226 and the drain 228 of each of the inspection switches 220 can be formed by performing one manufacturing step, and it is not necessary to perform any additional manufacturing step.

After the inspection is completed, the active device array substrate 10 can be applied to a display panel. While the display panel displays images, the display signals of the pixel structures 300 are no longer provided by the inspection control lines 240 but are provided by an integrated circuit IC, and the integrated circuit IC can be connected to the conductive pads 500. At this time, a low voltage is provided to the gates 222 of the inspection switches 220, such that the inspection switches 220 are in an off state, and the display signals can be transmitted to the data lines 340 through the conductive pads 500, the auxiliary pads 700, and the second and first conductive wire segments 264 and 262. In the present embodiment, the electric conductivity of the second conductive wire segments 264 is lower than the electric conductivity of the first conductive wire segments 262; if the inspection switches 220 are in the off state, it is rather difficult for the display signals to be transmitted to the inspection switches 220 through the second conductive wire segments 264, such that the display signals cannot be easily leaked through the inspection switches 220 that are in the off state (i.e., the so-called tunneling effect). Thereby, the performance of the active device array substrate 10 can be guaranteed; in addition, if the active device array substrate 10 is applied to the display panel for driving a display medium, good display quality of the display panel can also be ensured.

Since the active device array substrate 10 provided in the present embodiment utilizes the second conductive wire segments 264 (with the relatively low electric conductivity) for reducing the likelihood of the tunneling effects, the inspection circuit 200 can be left on the active device array substrate 10 without deteriorating the performance of the active device array substrate 10. Accordingly, during the manufacturing process of the panel, the laser cutting step is no longer required for removing the inspection circuit 200, which is conducive to the improvement of the manufacturing efficiency and yield. Besides, as described above, the first and second conductive wire segments 262 and 264 can be formed by the same film layer where the inherent components are formed; therefore, it is not necessary to perform any additional manufacturing step, and the active device array substrate described herein can still be characterized by the second conductive wire segments 264 whose electric conductivity is lower than that of the first conductive wire segments 262.

FIG. 4 is a schematic view illustrating an active device array substrate according to a second embodiment of the invention. The active device array substrate 20 described in the present embodiment is similar to the active device array substrate 10; therefore, identical or similar components of the active device array substrates 20 and 10 are represented by the identical or similar reference numbers, and the similar functions will no longer be described hereinafter. The difference between the active device array substrate 20 described herein and the active device array substrate 10 lies in that the source 226 is located between the second conductive wire segment 264A and the gate 222, and that the conductive pads 500 are connected to the second conductive wire segment 264A of one of the inspection traces 260 through one of the pad openings 420. In the present embodiment, the active device array substrate 20 need not be equipped with the auxiliary pads 700.

Figure 5:
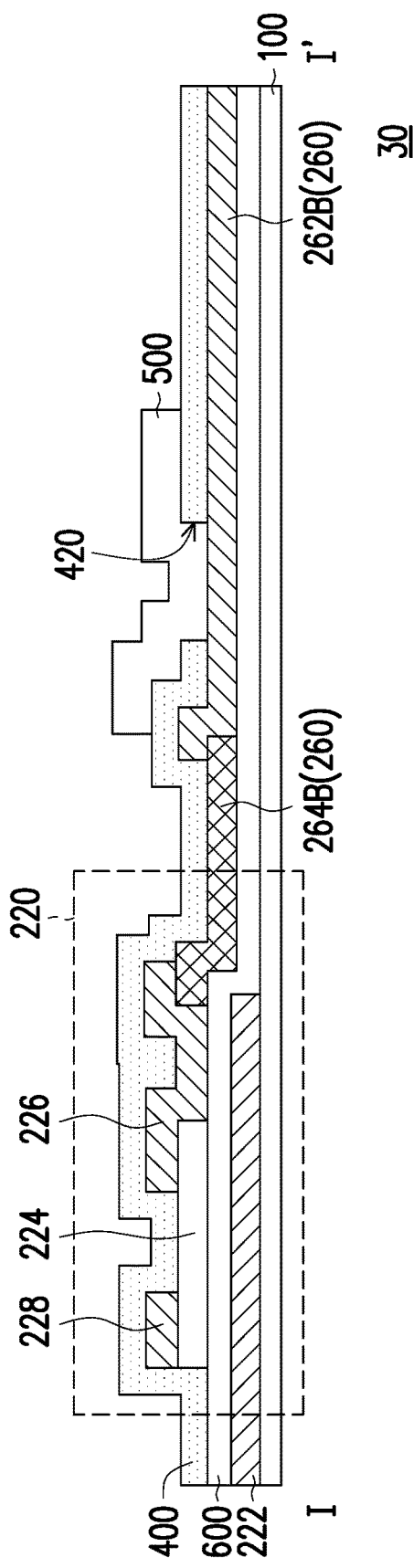
FIG. 5 is a schematic view illustrating an active device array substrate according to a third embodiment of the invention.

FIG. 5 is a schematic view illustrating an active device array substrate according to a third embodiment of the invention. The active device array substrate 30 described in the present embodiment is similar to the active device array substrate 10; therefore, identical or similar components of the active device array substrates 30 and 10 are represented by the identical or similar reference numbers, and the similar functions will no longer be described hereinafter. The difference between the active device array substrate 30 described herein and the active device array substrate 10 lies in that the second conductive wire segment 264B is located between the first conductive wire segment 262B and the substrate 100, and that the conductive pad 500 is in contact with the first conductive wire segment 262B through the pad opening 420. In the present embodiment, the active device array substrate 30 need not be equipped with the auxiliary pads 700 that are arranged in the active device array substrate 10. Besides, the first conductive wire segment 262B and the source 226 and the drain 228 of each of the inspection switches 220 belong to one film layer. The data line in each pixel structure and the first conductive wire segment 262B of the corresponding inspection trace 260 can belong to one film layer and can be an integrally formed conductive circuit, which is not shown in FIG. 5.

Figure 6:
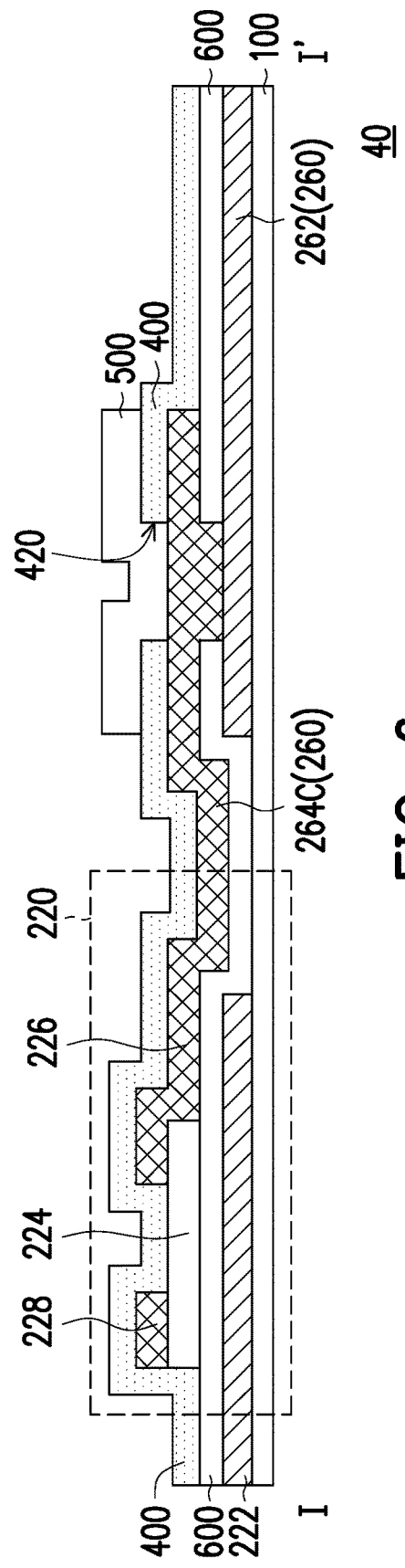
FIG. 6 is a schematic view illustrating an active device array substrate according to a fourth embodiment of the invention.

FIG. 6 is a schematic view illustrating an active device array substrate according to a fourth embodiment of the invention. The active device array substrate 40 described in the present embodiment is similar to the active device array substrate 10; therefore, identical or similar components of the active device array substrates 40 and 10 are represented by the identical or similar reference numbers, and the similar functions will no longer be described hereinafter. The difference between the active device array substrate 40 described herein and the active device array substrate 10 lies in that the source 226 of each inspection switch 220 and the second conductive wire segment 264C of the corresponding inspection trace 260 are integrally formed. In the present embodiment, the active device array substrate 40 need not be equipped with the auxiliary pads 700 that are arranged in the active device array substrate 10; alternatively, the auxiliary pads 700 may be arranged in the active device array substrate 40.

Figure 7:
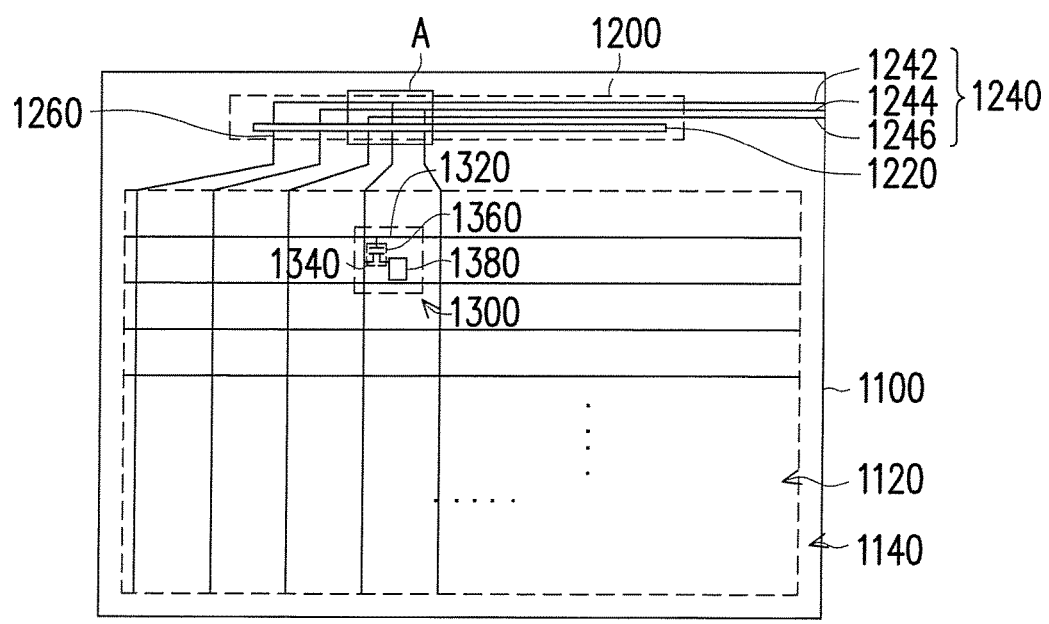
FIG. 7 is a schematic top view illustrating an active device array substrate according to a fifth embodiment of the invention.
Figure 8:
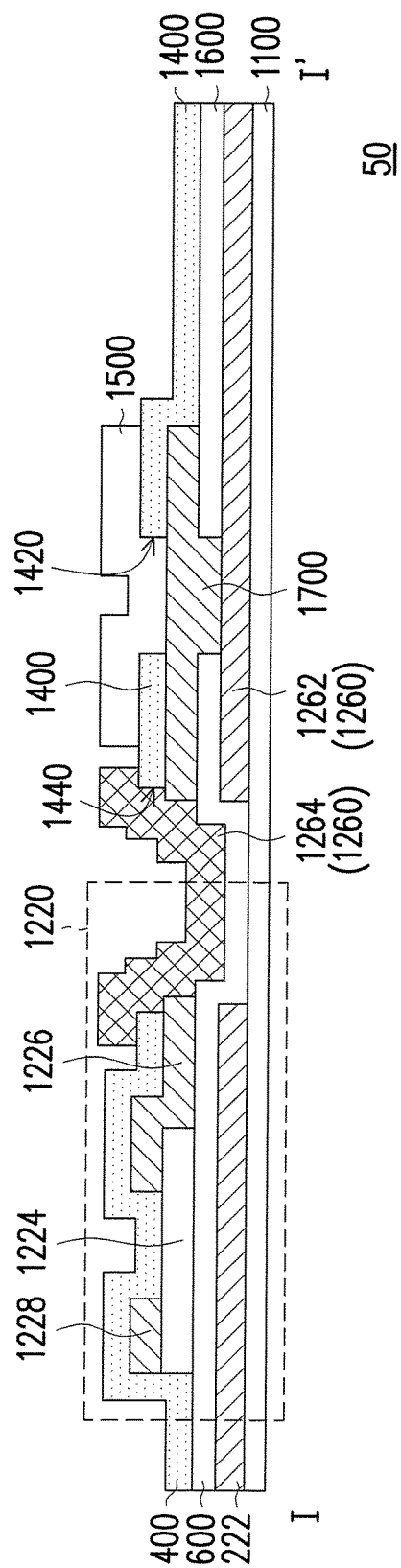
FIG. 8 is a schematic cross-sectional view illustrating a portion of the active device array substrate depicted in FIG. 7.

FIG. 7 is a schematic top view illustrating an active device array substrate according to a fifth embodiment of the invention. FIG. 8 is a schematic cross-sectional view illustrating a portion of the active device array substrate depicted in FIG. 7. With reference to FIG. 7 and FIG. 8, an active device array substrate 50 includes a substrate 1100, an inspection circuit 1200, a plurality of pixel structures 1300, a passivation layer 1400, and a plurality of conductive pads 1500. The substrate 1100 has a display area 1120 and a peripheral area 1140 outside the display area 1120. The inspection circuit 1200 is located on the substrate 1100 and includes a plurality of inspection switches 1220, a plurality of inspection control lines 1240, and a plurality of inspection traces 1260. Each of the inspection switches 1220 is located in the peripheral area 1140 and controlled by one of the inspection control lines 1240 to be switched on or off. Each of the inspection traces 1260 is connected to one of the inspection switches 1220 and includes a first conductive wire segment 1262 and a second conductive wire segment 1264. The second conductive wire segment 1264 is connected between the first conductive wire segment 1262 and a corresponding inspection switch 1220, and an electric conductivity of the second conductive wire segment 1264 is lower than an electric conductivity of the first conductive wire segment 1262. The pixel structures 1300 are arranged on the substrate 1100 and located in the display area 1120, and each of the pixel structures 1300 is connected to the first conductive wire segment 1262 of one of the inspection traces 1260. The passivation layer 1400 covers the inspection switches 1220 of the inspection circuit 1200 and has a plurality of pad openings 1420, and each of the pad openings 1420 corresponds to one of the first conductive wire segments 1262. The conductive pads 1500 are arranged on the passivation layer 1400, and each of the conductive pads 1500 is located in one of the pad openings 1420 to electrically connect one of the inspection traces 1260.

Particularly, each of the inspection switches 1220 includes a gate 1222, an active layer 1224, a source 1226, and a drain 1228. The gate 1222 is located between the substrate 1100 and the active layer 1224, the active layer 1224 is located between the source 1226 and the drain 1228, the source 1226 and the drain 1228 are in contact with the active layer 1224, the gate 1222 is separated from the active layer 1224, the source 1226, and the drain 1228 by an insulation layer 1600, and the source 1226 is connected to the second conductive wire segment 1264 of one of the inspection traces 1260. The inspection control lines 1240 include a first inspection control line 1242 connected to the $(2n-1)^{th}$ inspection switch 1220, a second inspection control line 1244 connected to the $(2n)^{th}$ inspection switch 1220, and a third inspection control line 1246 connected to the $(2n+1)^{th}$ inspection switch 1220, and n is a positive integer. As provided in the previous embodiment, the display color pixel structures 1300 can be categorized into red, blue, and green pixel structures, and the first inspection control line 1242, the second inspection control line 1244, and the third inspection control line 1246 may serve to examine the red, blue, and green pixel structures, respectively. Besides, the inspection control lines 1240 may further include a fourth inspection control line and a fifth inspection control line respectively configured to control the $(2n-1)^{th}$ inspection switch 1220 and the $(2n)^{th}$ inspection switch 1220.

In the present embodiment, the source 1226 is located between the second conductive wire segment 1264 and the gate 1222, and the passivation layer 1400 has a plurality of inspection openings 1440. Each of the inspection openings 1440 corresponds to the source 1226 of one of the inspection switches 1220 and one of the first conductive wire segments 1262, and each of the second conductive wire segments 1264 is located on the passivation layer 1400 and located in one of the inspection openings 1440, so as to electrically connect the source 1226 of the one of the inspection switches 1220 to the one of the first conductive wire segments 1262. Here, a material of the second conductive wire segment 1264 includes conductive oxide, metal, an organic conductive material, or a combination thereof, and an electric conductivity of the second conductive wire segment 1264 is lower than an electric conductivity of the first conductive wire segment 1262.

Each of the pixel structures 1300 includes a scan line 1320, a data line 1340, an active device 1360, and a pixel electrode 1380. The scan line 1320 is configured to control whether the active device 1360 is switched on or switched off, and the active device 1360 is configured to transmit a signal on the data line 1340 to the pixel electrode 1380 while the active device 1360 is in an on state. Here, the pixel structure 1300 can be a vertical alignment (VA)-type pixel structure, a twisted nematic (TN)-type pixel structure, an in-plane switching (IPS)-type pixel structure, or any other pixel structure.

The data line 1340 of one of the pixel structures 1300 is connected to the first conductive wire segment 1262 of one of the inspection traces 1260. Specifically, the data line 1340 and the first conductive wire segment 1262 of the corresponding inspection trace 1260 can belong to one film layer and can be an integrally formed conductive circuit. Thereby, when a high voltage is supplied to the gate 1222 of the inspection switch 1220, i.e., if the inspection switch 1220 is on, the inspection signals from the first, second, and third inspection control lines 1242, 1244, and 1246 of the inspection control lines 1240 are respectively transmitted to the drains 1228 of the corresponding inspection switches 1220, are sequentially transmitted to the second and first conductive wire segments 1264 and 1262 of the inspection trace 1260 through the inspection switch 1220 in the on state, and are input to the data line 1340. At this time, the active device 1360 is turned on by the scan line 1320, and the inspection signal can then be transmitted to the pixel electrode 1380, so as to carry out the inspection of the active device array substrate 50.

The active device array substrate 50 provided in the present embodiment may further include a plurality of auxiliary pads 1700, and each of the auxiliary pads 1700 is located between one of the conductive pads 1500 and one of the inspection traces 1260, such that the one of the conductive pads 1500 is electrically connected to the one of the inspection traces 1260 via the each of the auxiliary pads 1700. Here, the auxiliary pads 1700 and the source 1226 and the drain 1228 of each of the inspection switches 1220 belong to one film layer, i.e., the auxiliary pads 1700 and the source 1226 and the drain 1228 of each of the inspection switches 1220 can be formed by performing one manufacturing step, and it is not necessary to perform any additional manufacturing step.

After the inspection is completed, the active device array substrate 50 can be applied to a display panel. While the display panel displays images, the display signals of the pixel structures 1300 are provided by an integrated circuit IC, and the integrated circuit IC can be connected to the conductive pads 1500. At this time, referring to the cross-sectional view in FIG. 8, a low voltage is provided to the gate 1222 of the inspection switch 1220, such that the inspection switch 1220 is in an off state, and the display signals can be transmitted to the data line 1340 through the conductive pad 1500, the auxiliary pad 1700, and the second and first conductive wire segments 1264 and 1262. In the present embodiment, the electric conductivity of the second conductive wire segment 1264 is lower than the electric conductivity of the first conductive wire segment 1262; if the inspection switch 1220 is in the off state, it is rather difficult for the display signals to be transmitted to the inspection switch 1220 through the second conductive wire segment 1264, such that the display signals cannot easily leak through the inspection switch 1220 that is in the off state (i.e., the so-called tunneling effect). Thereby, the performance of the active device array substrate 50 can be guaranteed; in addition, if the active device array substrate 50 is applied to the display panel for driving a display medium, good display quality of the display panel can also be ensured.

In addition, since the active device array substrate 50 provided in the present embodiment utilizes the second conductive wire segment 1264 (with the relatively low electric conductivity) for preventing the display/inspection signals sent by the integrated circuit IC from being transmitted to the inspection switches 1220, the inspection circuit 1220 can be left on the active device array substrate 50 without deteriorating the performance of the active device array substrate 50. Accordingly, during the manufacturing process of the panel, the laser cutting step is no longer required for removing the inspection circuit 1200, which is conducive to the improvement of the manufacturing efficiency and yield. Besides, as described above, the first and second conductive wire segments 1262 and 1264 can be formed by the film layers where the inherent components are formed; therefore, it is not necessary to perform any additional manufacturing step, and the active device array substrate described herein can still be characterized by the second conductive wire segments 1264 whose electric conductivity is lower than that of the first conductive wire segments 1262.

Figure 9:
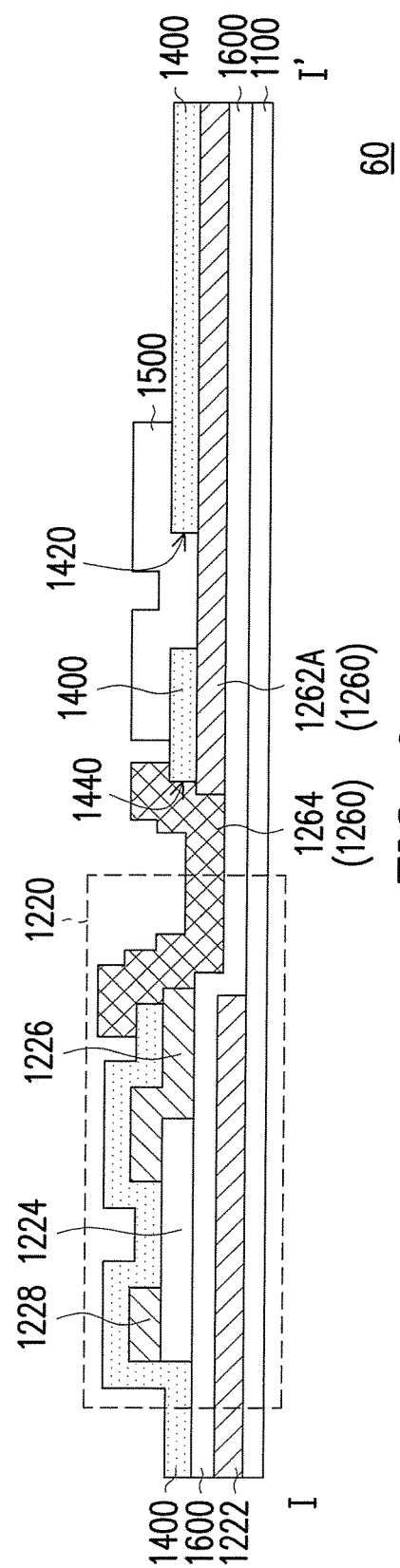
FIG. 9 is a schematic view illustrating an active device array substrate according to a sixth embodiment of the invention.

FIG. 9 is a schematic view illustrating an active device array substrate according to a sixth embodiment of the invention. The active device array substrate 60 described in the present embodiment is similar to the active device array substrate 50; therefore, identical or similar components of the active device array substrates 60 and 50 are represented by the identical or similar reference numbers, and the similar functions will no longer be described hereinafter. The difference between the active device array substrate 60 described herein and the active device array substrate 50 lies in that the source 1226 and the drain 1228 of each inspection switch 1220 and the first conductive wire segment 1262A belong to one film layer.

To sum up, the electric conductivity of the second conductive wire segments is lower than that of the first conductive wire segments, the second conductive wire segments are located between the first conductive wire segments and the inspection switches, and the conductive pads are arranged corresponding to the first conductive wire segments. If the inspection switches are in the off state, the display/inspection signals input by the conductive pads are not transmitted to the inspection switches through the second conductive wire segments and are thus not leaked. Thereby, the active device array substrate can have favorable performance. When the active device array substrate is applied to the display panel for driving the display medium, favorable display quality of the display panel can be ensured. Moreover, as described above, the inspection circuit can be left on the active device array substrate without deteriorating the performance of the active device array substrate. Accordingly, during the manufacturing process of the panel, the laser cutting step is no longer required for removing the inspection circuit, which is conducive to the improvement of the manufacturing efficiency and yield. Besides, the first and second conductive wire segments can be formed by the film layers where the inherent components are formed; therefore, it is not necessary to perform any additional manufacturing step, and the active device array substrate described herein can still be characterized by the second conductive wire segments whose electric conductivity is lower than that of the first conductive wire segments.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An active device array substrate comprising:
   a substrate having a display area and a peripheral area outside the display area;
   an inspection circuit arranged on the substrate, the inspection circuit comprising a plurality of inspection switches, a plurality of inspection control lines, and a plurality of inspection traces, each of the inspection switches being located in the peripheral area and controlled by one of the inspection control lines to be switched on or off, each of the inspection traces being connected to one of the inspection switches and comprising a first conductive wire segment and a second conductive wire segment, wherein the second conductive wire segment is connected between the first conductive wire segment and a corresponding inspection switch of the inspection switches, and an electric conductivity of the second conductive wire segment is lower than an electric conductivity of the first conductive wire segment;
   a plurality of pixel structures arranged on the substrate and located in the display area, each of the pixel structures being connected to the first conductive wire segment of one of the inspection traces;
   a passivation layer covering the inspection switches of the inspection circuit and having a plurality of pad openings, wherein each of the pad openings corresponds to one of the first conductive wire segments; and
   a plurality of conductive pads arranged on the passivation layer, each of the conductive pads being located in one of the pad openings to electrically connect one of the inspection traces.

2. The active device array substrate of claim 1, wherein each of the inspection switches comprises a gate, an active layer, a source, and a drain, the gate is located between the substrate and the active layer, the active layer is located between the source and the drain, the source and the drain are in contact with the active layer, the gate is separated from the active layer, the source, and the drain by an insulation layer, and the source is connected to the second conductive wire segment of one of the inspection traces.

3. The active device array substrate of claim 2, wherein the source of each of the inspection switches and the second conductive wire segment of one of the inspection traces connected to the each of the inspection switches are integrally formed.

4. The active device array substrate of claim 2, wherein the first conductive wire segment is located between the second conductive wire segment and the substrate.

5. The active device array substrate of claim 4, wherein the second conductive wire segment is located between the source and the gate.

6. The active device array substrate of claim 4, wherein the source is located between the second conductive wire segment and the gate, the passivation layer has a plurality of inspection openings, each of the inspection openings corresponds to the source of one of the inspection switches and one of the first conductive wire segments, and each of the second conductive wire segments is arranged on the passivation layer and located in one of the inspection openings, so as to electrically connect the source of the one of the inspection switches to the one of the first conductive wire segments.

7. The active device array substrate of claim 2, wherein the second conductive wire segments are located between the first conductive wire segments and the substrate, and the conductive pads are in contact with the first conductive wire segments via the pad openings.

8. The active device array substrate of claim 2, wherein the gate of each of the inspection switches and the first conductive wire segment of the one of the inspection traces connected to the each of the inspection switches belong to one film layer, the active device array substrate further comprises a plurality of auxiliary pads, and each of the auxiliary pads is located between one of the conductive pads and one of the inspection traces, such that the one of the conductive pads is electrically connected to the one of the inspection traces via the each of the auxiliary pads.

9. The active device array substrate of claim 8, wherein the auxiliary pads and the source and the drain of each of the inspection switches belong to one film layer.

10. The active device array substrate of claim 2, wherein the first conductive wire segments and the source and the drain of each of the inspection switches belong to one film layer.

11. The active device array substrate of claim 1, wherein each of the pixel structures comprises a scan line, a data line, an active device, and a pixel electrode, the scan line is configured to control whether the active device is switched on or switched off, and the active device is configured to transmit a signal on the data line to the pixel electrode while the active device is in an on state.

12. The active device array substrate of claim 11, wherein each of the inspection traces is connected to the data line of one of the pixel structures.

13. The active device array substrate of claim 11, wherein each of the pixel structures further comprises a common electrode, the common electrode and the pixel electrode constitute one storage capacitor, one of the pixel electrode and the common electrode is located between the substrate and the other one of the pixel electrode and the common electrode, and the second conductive wire segment of each of the inspection traces and the one of the pixel electrode and the common electrode belong to one film layer.

* * * * *